Reissued Apr. 20, 1926. Re. 16,328

UNITED STATES PATENT OFFICE.

LESTER KIRSCHBRAUN, OF CHICAGO, ILLINOIS.

EMULSION AND PROCESS OF MAKING SAME.

No Drawing. Original No. 1,479,042, dated January 1, 1924, Serial No. 510,127, filed October 24, 1921. Application for reissue filed December 30, 1925. Serial No. 78,473.

*To all whom it may concern:*

Be it known that I, LESTER KIRSCHBRAUN, a citizen of the United States, residing in the city of Chicago, county of Cook, and State of Illinois, have invented certain new and useful Improvements in Emulsions and Processes of Making Same, of which the following is a specification.

This invention relates to improvements in emulsions and process of making same, and is an improvement on a process of making continuous emulsion heretofore invented by me and set forth in application for Letters Patent, United States Serial No. 274,497, filed February 1st, 1919, Patent No. 1,417,835 patented May 30th, 1922.

In the process of making emulsions heretofore invented by me the emulsion is preferably formed from water, colloidal clay and asphalt or other suitable pitchy or bituminous material. In such emulsions the water forms the external and the asphalt the internal phases respectively.

The object of the present invention is to produce a more effective emulsion, of a higher degree of nonadhesiveness and finer dispersion of the asphaltic particles.

In the emulsion of the present invention, the dispersion of the asphaltic particles is so fine that the emulsion when formed will pass through a standard 325-mesh screen having approximately ninety thousand (90,000) openings per square inch, said openings having an average size of .044 millimeter. About ninety-eight per cent (98%) of the emulsion in the present invention on the basis of weight will readily pass through a screen of the character referred to.

The emulsion may be formed as follows:

A mixer provided with suitably agitated mechanism, such, for example, as is shown in joint application of myself and Frederick C. Overbury, Serial No. 343,392, December 8th, 1919, is charged with water and colloidal clay, the proportions being such as to make a relatively stiff and viscous paste. The consistency is such as to produce a very sluggish circulation of the paste. This paste is raised to a temperature of say 170° F., and to it is gradually added while the agitation proceeds asphalt of 160° F. melting point in hot liquid condition. The asphalt may be at a temperature of say 320° F. as it is fed to the mixer. There is formed thereby a bulk supply of nonadhesive emulsion, in which the asphalt forms the internal phase.

To the bulk supply is preferably continuously added a stream of colloidal clay suspension in water, there being sufficient clay as to insure the stream having substantial viscosity over and above water. This clay suspension is preferably heated to say the temperature of 120° F. in order to prevent undue lowering of the temperature in the mixer. At the same time there is continuously fed a stream of hot liquid asphalt of the same character as heretofore referred to and at the same temperature.

The streams of asphalt and clay suspension meet the bulk supply near the center of the latter, and inasmuch as the bulk supply itself has a relatively sluggish movement, the initial movement of the fresh stock downwardly into the bulk supply is also relatively sluggish. At the same time the propeller blades are rotated at a relatively high rate of speed, for example say 900 to 1000 revolutions per minute, so that its cutting action in a horizontal plane is great. The operation is such that as the fresh stock passes slowly downwardly through the bulk supply by the propellers, it is cut a maximum number of times by the propeller blades. The effect of this rapid rotation of the propellers through a sluggish or slowly forwardly moving mass, is to tend to elongate the asphalt stream into exceedingly elongated thread-like particles, which ultimately become so fine as to break up into very minute dispersed and discrete emulsified particles of asphalt. It will be understood that as the rate of rotation of the propellers in a horizontal direction is increased relative to the rate of a downward or forward movement of the mass, the degree of dispersion of the emulsified asphalt particles will be increased.

Therefore, it is possible to not merely make an emulsion which will pass a screen of the character referred to, but one in which the asphaltic particles are so finely dispersed as to approach colloidal dimensions. Such particles may have an average dimension of .005 of a millimeter. Particles of this character, when viewed under a microscope, appear to have a tendency to rush together and cluster without fusing.

It is to be understood that this invention is not directed to a mere comminution of asphalt, but is descriptive of the mechanism and the stages through which a true emulsifiying operation proceeds.

I claim as my invention:

1. A non-adhesive emulsion, consisting of water, collodial clay and asphalt, the asphaltic particles being so finely dispersed that more than 95% by weight of the emulsion will pass a screen having openings not larger than .044 of a millimeter.

2. A process of making a non-adhesive emulsion, consisting in making a bulk supply of water, an emulsifying agent and a waterproof pitchy binder, continously adding a collodial clay suspension of appreciable viscosity and a pitchy binder in liquid condition to said bulk supply, passing such binder and clay suspension slowly through the bulk supply, and simultaneously causing a rapid rotation of propeller blades through said binder and clay suspension transversely of their path of movement and at a sufficient speed to produce an emulsion 95% by weight of which will pass a screen having openings not in excess of .044 of a millimeter in size.

3. A process of making a non-adhesive emulsion, consisting in forming an emulsified bulk supply of water, and emulsifying agent, and a waterproof pitchy binder, adding an emulsifying agent and pitchy binder in liquid condition to said bulk supply, and simultaneously subjecting said binder and emulsifying agent to such agitation as will produce an emulsion, of which 90% of the particles of binder will be less than .044 of a millimeter in size.

4. A process of making a non-adhesive emulsion, consisting in forming a bulk supply of water, colloidal clay and a waterproof pitchy binder, adding colloidal clay and pitchy binder in liquid condition to said bulk supply, and simultaneously subjecting said binder and colloidal clay to such agitation as will produce an emulsion, of which 90% of the particles of binder will be less than .044 of a millimeter in size.

5. A process of making a non-adhesive emulsion with water as the external phase, consisting in forming an emulsified bulk supply of water, an emulsifying agent and a waterproof pitchy binder, adding an emulsifying agent and pitchy binder in liquid condition to said bulk supply, simultaneously subjecting said binder and emulsifying agent while contained in the bulk supply, to such agitation as will produce an emulsion of which 90% of the particles of binder will be less than .044 of a millimeter in size, and discharging emulsion from the bulk supply at substantially the same rate at which its constituents are added thereto.

LESTER KIRSCHBRAUN.